United States Patent [19]

Aignesberger et al.

[11] 4,284,433

[45] Aug. 18, 1981

[54] ADDITIVES FOR WATER-HARDENING BINDING AGENTS

[75] Inventors: Alois Aignesberger, Trostberg; Jean-Pierre Deppen, Tacherting; Hans-Günter Rosenbauer, Trostberg, all of Fed. Rep. of Germany

[73] Assignee: SKW Trostberg Aktiengesellschaft, Trostberg, Fed. Rep. of Germany

[21] Appl. No.: 29,816

[22] Filed: Apr. 13, 1979

[30] Foreign Application Priority Data

Apr. 19, 1978 [DE] Fed. Rep. of Germany ....... 2817080

[51] Int. Cl.³ .................. C04B 31/30; C08H 5/04; C08K 3/06; C08J 3/20
[52] U.S. Cl. ............................ 106/90; 106/98; 106/314; 106/315; 106/97; 525/472; 525/505; 525/509; 525/143; 525/156; 525/158; 525/227; 525/230; 525/222; 526/317; 526/342; 260/124 R; 106/308 M
[58] Field of Search ............... 106/97, 98, 314, 315, 106/90, 308 M; 260/29.67, 124 R; 525/143, 156, 158, 222, 230, 472, 505, 509; 526/317, 342

[56] References Cited

U.S. PATENT DOCUMENTS

| 2,650,171 | 8/1953 | Schaaf | 106/98 |
| 2,776,914 | 1/1957 | Faulwetter | 106/97 |
| 2,835,602 | 5/1958 | Benner | 106/98 |
| 3,042,535 | 7/1962 | Hiltrop et al. | 106/97 |
| 3,192,060 | 6/1965 | Tilsen | 106/97 |
| 3,197,323 | 7/1965 | Rehmar | 106/314 |
| 4,036,301 | 7/1977 | Powers et al. | 106/315 |
| 4,040,855 | 8/1977 | Rady-Pentek et al. | 106/97 |
| 4,047,967 | 9/1977 | Majidzadeh et al. | 106/97 |
| 4,095,995 | 6/1978 | Ullrich | 106/97 |
| 4,143,202 | 3/1979 | Tseng et al. | 106/97 |

Primary Examiner—James Poer
Attorney, Agent, or Firm—Sprung, Felfe, Horn, Lynch & Kramer

[57] ABSTRACT

Water-hardening binding agent such as concrete, mortar, cement and the like are modified with a solid additive in the form of aggregates consisting of fine particle having a grain size of from 0.1 to 10 mm, preferably in pelletized or pressed grain form. These additives have an adjustable rate of dissolution and permit controlling the speed and manner of hardening of said water-hardening binding agent.

13 Claims, 13 Drawing Figures

Fig. 5 (EXAMPLE 5)

Fig. 6 (EXAMPLE 6)

Fig. 9 (EXAMPLE 9)

Fig. 11 (EXAMPLE 11)

Fig. 10 (EXAMPLE 10)

Fig. 12 (EXAMPLE 14)

ADDITIVES FOR WATER-HARDENING BINDING AGENTS

The present invention relates to solid additives for binding agents which harden with water, e.g., concrete, cement, mortar, and the like. More specifically, the additives of the invention permit regulation of the dissolution speed.

It is known to improve the properties of binding agents hardening with water, especially of constructional materials, by the use of additives. Conventional dispersion agents and liquefiers for concrete, mortar and floor plaster bring about an improvement of the plastifying action of the constructional materials and serve as dispersion agents. By reducing the need for make-up water, the accumulation of water in hollow spaces, such as capillaries, pores and bubbles, which, after the hardening and drying out of the concrete products, could lead to losses of strength, are avoided. Furthermore, plastifying additives reduce the excess proportion of water and give a denser structure of the constructional material, resulting in a higher final strength.

West German Pat. No. 1,471,153 describes as additives for mortar and cement, aqueous synthetic resin dispersions which contain mixed polymers based on styrene and acrylonitrile and a compound co-polymerizable therewith, which is preferably acrylic acid. West German Pat. No. 1,238,831 describes, as dispersion agents for cement, products which are obtained by condensing naphthalene-sulphonic acid derivatives and formaldehyde and West German Pat. No. 1,671,017 describes resins, modified by sulphite or sulphonic acid, based on an amino-s-triazine with at least two $NH_2$ groups, i.e. especially melamine-formaldehyde resins modified with sulphite or sulphonic acid. The latter additives give, by reaction of the resin with the binding agent, increased initial and ultimate strengths, which are extremely desirable in practice. The speed of casting the concrete can thereby be considerably increased, the demoulding time shortened, laid floors can be used sooner and higher concrete qualities can be achieved.

However, by use of these known additives, the working times obtained are frequently too short, which can cause difficulties. For instance, if the casting procedure is disturbed or interrupted, the originally adjusted consistency of the concrete changes too quickly. Therefore, retarders are conventionally employed and then are introduced into the concrete simultaneously with the liquefier. In this way, a more constant workability is achieved but the desired initial strength is not obtained, i.e., delayed so that the required strength is only achieved after several days, depending upon dosing.

The present invention substantially overcomes the disadvantages of the known additives and provides additives which have the advantages but not the disadvantages of the known additives.

The solid additives of the present invention have an adjustable rate of dissolution for binding agents hardening with water. Essentially, the additives, optionally provided with a coating, are in the form of aggregates, consisting of fine particles, with a grain size of from 0.1 to 10 mm. The additives can, for example, act as liquefying, plasticizing, accelerating, retarding and hydrophobing agents. They can also serve to introduce air pores and can act as sealing agents or as thickening agents. We have surprisingly found that additives can be provided which possess the desired properties when powdered additives are pressed or pelletized to this grain size. Since there is a difference between the rate of dissolution of pelletized and pressed grains, the various embodiments of the invention can be utilized for a large variety of purposes.

According to the present invention, fine-grained material is mechanically compressed, with or without the addition of organic or inorganic binding agents. The fine-grained material used can be any of the known additives for mortar, concrete and cement, i.e., generally for constructional materials which harden under the influence of water. In particular, the additives can be used which are known from West German Pat. Nos. 1,471,153; 1,671,017 and 1,238,831. Examples of such additives include sulphonic acid group-containing melamine-formaldehyde polycondensation products, naphthalenesulphonic acid-formaldehyde polycondensation products, phenolsulphonic acid-formaldehyde polycondensation products, lignin sulphonate and co-polymers based on styrene and acrylonitrile, which optionally contain other components co-polymerisable therewith, preferably acrylic acid. Such additives for binding agents and especially for cement are frequently commercially available and are widely described in the literature. In the past, all these additives have been used in powder form or in solution. According to the present invention, however, these fine-grained additives are mechanically compressed or pellitized, with or without the addition of organic or inorganic binding agents. The binding agents employed can be any of these conventionally used. In the case of wetting with organic or inorganic, liquid or solid binding agents, the fine-grained materials cake. Whereas the active material of the pelletised grains is available relatively quickly, the compressed additives dissolve relatively slowly and thus are available over a longer period of time.

Completely surprisingly, we have found that the compressed and solidified additives (aggregates) display a markedly better action than the powdered ones. This action could not have been predicted.

Furthermore, we have, surprisingly, ascertained that, by increasing grain size according to the present invention, less active material has to be used than in the case of the previously known processes in order to achieve the same effects.

The additives according to the present invention have a particle size of up to about 10 mm. and, in general, the particles have a size in the range of 0.1 to 10 mm. and preferably of 0.5 to 5 mm. Especially good results have been obtained when the size of the aggregate is in the range of from 0.5 to 3 mm., the most preferred range being from 1 to 3 mm.

The optimum particle size of the additives is limited to aggregates with a diameter of about 10 mm. In the case of particle sizes above this, the grains are apparently again comminuted in the concrete mixer by the heavy added materials. Furthermore, when working up large additive granules, it is to be expected that, after their distribution in the hardened product, comparatively large hollow spaces will remain and the strength of the product will thus be considerably impaired. Having regard to this, grain sizes of up to 10 mm. should, in general, be regarded as being the maximum size. Of course, in exceptional cases, it may be desirable to use particles with a diameter greater than 10 mm.

The delay of dissipation of the granulated grains can be further improved with the help of coatings, for which purpose there can be used, for example, polyvinyl acetates, polyvinyl propionates or polyacrylates, i.e. synthetic resins which are known to be useful as coatings, as well as inorganic products, for example hydrated cement or gypsum. Indeed, all coatings which are sparingly or slowly soluble in water can be used.

The additives according to the present invention can be used for all kinds of binding agents hardening with water. However, they are preferably used with cement, concrete and mortar.

Thus, the present invention also provides a process for regulating the working time of binding agents hardening with water, wherein there is used an aggregate according to the present invention. The aggregate used is preferably in pelletised or compressed form and preferably has a size of from 0.5 to 10 mm.

According to the present invention, it is now possible successfully to employ the known constructional material additives everywhere where their use was previously not possible because of the shortened setting time of the hydraulic binding agents. Thus, for example, finished-mix floor covering masses are commercially available. Before working up, it is merely necessary to add thereto the amount of water needed for pouring. Because of the ripening time which various components, such as polyvinyl alcohol, need for swelling, the inorganic binding agents already harden again, accelerated by the additives, before the mass is worked up. By means of the present invention, such problems can readily be solved.

The additives according to the present invention can be produced in known manner by processes which are conventionally used for the production of pellets, briquettes and the like and which are described, for example, in Ullmanns Enzyclopadie der technische Chemie, pub. Verlag Urban and Schwarzenberg, Munchen, 3rd edn., Vol.1, pp. 731-736/1951.

The present invention will now be explained in more detail, with reference to the accompanying drawings.

The accompanying drawings illustrate the results obtained with the use of the additives according to the present invention and those obtained with the use of known additives. In the accompanying drawings, the time in minutes is given on the abscissae and on the ordinate the flow measurement in cm. It can be seen that the products according to the present invention display higher flow measurements during the first two hours than the known additives.

The following Examples are given for the purpose of illustrating the present invention, the following abbreviations being used for reasons of simplicity:
SMFP sulphonic acid group-containing melamine-formaldehyde polycondensation products
NSFP naphthalenesulphonic acid-formaldehyde polycondensation product
LS lignin sulphonate
EG ethylene glycol
PEG polyethylene glycol
DIN German Industrial Standard For testing the constructional materials, the following determination processes were employed:
(A) cement flow measurement
(B) standard mortar spreading measurement
(C) concrete spreading measurement
(D) levelling mass spreading measurement

(A) CEMENT FLOW MEASUREMENT cement: PZ 35 F DIN 1164*

*PZ35F is a portland cement, which according to the German Industrial Standard DIN 1164 has a compression strength of at least 35 N/mm² after 28 days. PZ35F may be compared with cement type I according to ASTM C 150.

additives: powder, pellets and briquettes of SMFP, NSFP and LS. The dosaging refers to the cement.

additive addition: the additives are mixed into the cement.

water: the flow measurement of cement paste without addition is adjusted to 18±1 cm. and further flow measurements are assessed on this water cement ratio.

Preparation and determination of the cement paste:

300 g. cement are sprinkled, within the course of 1 minute, into a weighed amount of water in a squat 1 liter glass beaker. After a settlement time of 1 minute, the slurry is well mixed for 2 minutes with a spoon. This cement paste is subsequently poured into a vicat ring up to the edge thereof, this vicat ring standing on a dry, fat-free, flat glass plate. Immediately after the filling, the vicat ring is raised 2 cm. and held for about 5 seconds over the outflowing slurry. The diameter of the slurry is determined in two axes lying orthogonally to one another. The flow measure in cm. is the arithmetic average of these two measurement values. The additives are admixed with the cement.

Flow measure as a function of the time:

After a pot life of 15, 30, 60, 90 and 120 minutes, the cement paste is again stirred for 2 minutes and the flow test is carried out as described above.

(B) STANDARD MORTAR SPREADING MEASUREMENT

Mortar mixture: as described in DIN 1164, June, 1970 edition
additives: standard sand
cement: PZ 35 F DIN 1164
additives: powder, pellets and briquettes of SMFP, NSFP and LS. The dosaging refers to the cement.
additive addition: the additives are admixed with the cement.
water: the water-cement ratio is first determined and the spreading measurement must amount to 18±1 cm. All further spreading measurements are assessed on this water cement ratio.
mortar preparation: according to DIN 1164, page 7, June, 1970 edition.
spreading measurement experiment: according to DIN 1164, December, 1958 edition.
spreading measurement as a function of the time:
After a pot life of 15, 30, 60, 90 and 120 minutes, the standard mortar is again mixed for 30 seconds at 285 rpm. The spreading measurement is subsequently determined.

(C) CONCRETE SPREADING MEASUREMENT

Concrete mixture:
Additives: 2.0 kg. crystal quartz 1600 mesh; 26.0 kg. sand 0 to 4 mm.; 12.0 kg. gravel 4 to 8 mm.; 16.8 kg. gravel 8 to 16 mm.; 32.2 kg. gravel 16 to 32 mm.
cement: 12.0 kg. PZ 35 F DIN 1164
cement content: about 300 kg./cm³ in the solid concrete
additives: powder, pellets and briquettes of SMFP, NSFP and LS. The dosaging refers to the cement.
additive addition: 2 minutes before ending the mixing.

water. The water-cement ratio is first determined, the spreading measurement thereby amounting to 42±2 cm.

mixer: 70 liter free fall mixer concrete production: additives (moist) and cement are mixed for 2 minutes and, after the addition of water, mixed for a further minute. Thereafter, the additive is added, followed by mixing for 2 minutes.

spreading experiment: according to DIN 1048 (January, 1972 edition) after 0, 30, 60, 90 and 120 minutes. Before each determination of the spreading measurement, the concrete is mixed for 0.5 minute. Between the experiments, the concrete is covered with a plastics film.

(D) FLOW MEASUREMENT OF A LEVELLING MASS basic formulation: 135 g. cement PZ 45 F DIN 1164; 105 g. quartz sand; 60 g. fine quartz powder; 75 g. water.

Mixing and assessment takes place as in (A). The dosaging of the additive refers to the cement.

wetting the powder
drying by flow-through of warm air
grinding up and sieving out the desired particle size.

The pellets produced and the original powder were tested by determination method (D), the following results being obtained:

| additives | particle size (mm.) | dosaging, ref. to cement (%) | water-cement ratio | flow measurement in cm. after min. | | | | | |
| --- | --- | --- | --- | --- | --- | --- | --- | --- | --- |
| | | | | 0 | 15 | 30 | 60 | 90 | 120 |
| SMFP powder | 0-0.2 | 0.7 | 0.55 | 20.8 | 15.4 | 13.3 | — | 9.1 | — |
| SMFP pellets | 2.5-5 | 0.7 | 0.55 | 24.4 | 24.6 | 24.8 | 24.4 | 24.3 | 23.0 |

Figure 1:
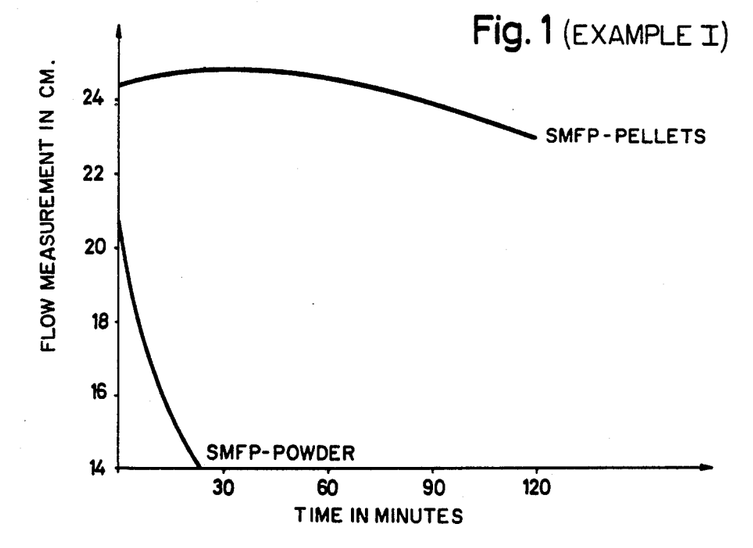
FIGS. 1 to 11 graphically illustrate the results obtained in the following Examples 1 to 11 and FIGS. 12 and 13 graphically illustrate the results obtained in the following Examples 14 and 15.

The results obtained are graphically illustrated in FIG. 1 of the accompanying drawings, the time in minutes being given on the abscissa and the flow measurement in cm. on the ordinate.

EXAMPLE 2

Production of pellets

SMFP pellets, produced analogously to Example 1, were sprayed with the following solution:
300 g. copolymer of vinyl acetate and crotonic acid
100 g. xylene
500 g. methanol 150 g. of this mixture were sprayed on to 500 g. SMFP pellets and subsequently dried.

The SMFP powder, as well as the coated and uncoated pellets, were tested by determination method (A), the following results being obtained:

| additives | particle size (mm.) | dosaging, ref. to cement (%) | water-cement ratio | cement flow measurement in cm. after min. | | | | | |
| --- | --- | --- | --- | --- | --- | --- | --- | --- | --- |
| | | | | 0 | 15 | 30 | 60 | 90 | 120 |
| without SMFP | — | | 0.45 | 17.7 | 17.9 | 17.9 | 17.5 | 17.6 | 17.0 |
| SMFP powder | 0-0.2 | 0.3 | 0.45 | 24.3 | | 21.7 | 20.2 | 18.7 | 17.9 |
| SMFP pellets | 2.5-5 | 0.3 | 0.45 | 26.8 | 28.3 | 28.1 | 26.7 | — | 25.2 |
| SMFP pellets coated | 2.5-5 | 0.3 | 0.45 | 20.8 | 26.8 | 28.2 | 27.5 | 27.0 | 27.0 |

| sand sieve analyses: particle sizes (mm.) | Amount (wt. %) | |
| --- | --- | --- |
| | fine quartz powder | quartz sand |
| 0.300-0.250 | 1 | 3 |
| 0.250-0.125 | 19 | 82 |
| 0.125-0.063 | 31 | 15 |
| 0.063-0.040 | 15 | 0 |
| 0.040-0 | 34 | |

EXAMPLE 1

Production of pellets

Figure 2:
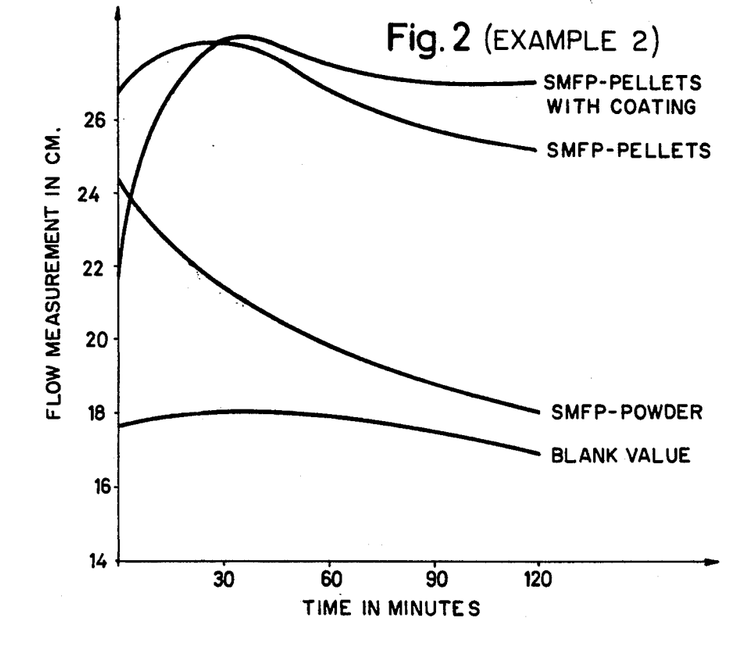

An SMFP powder with a particle size of 0 to 0.2 mm. was placed in a laboratory pelleting dish with a diameter of 50 cm. As wetting liquid, there was employed a 33% aqueous SMFP solution. The agglomerates initially obtained were formed into pellets in several working steps. The cycle was carried out as follows:

The results obtained are illustrated graphically in FIG. 2 of the accompanying drawings.

EXAMPLE 3

Production of pellets

The SMFP pellets, with and without a coating, were produced as in Example 1 or 2. The film-forming solution used consisted of:
100 g. polyvinyl acetate
90 g. toluene
810 g. methanol.

80 g. film-forming solution were mixed with 100 g. SMFP pellets in a rotary evaporator and the solvent stripped off. Thereafter, the pellets were dried for 2 hours at 80° C. in a drying cabinet.

The SMFP pellets with and without the coating, as well as SMFP powder, were tested by determination method (A), the following results being obtained:

| additives | particle size (mm.) | dosaging, ref. to cement (%) | water-cement ratio | flow measurement in cm. after min. | | | | | |
|---|---|---|---|---|---|---|---|---|---|
| | | | | 0 | 15 | 30 | 60 | 90 | 120 |
| without SMFP | — | — | 0.45 | 18.1 | — | 18.4 | 17.8 | 16.5 | 16.2 |
| powder SMFP | 0–0.2 | 0.3 | 0.45 | 24.3 | — | 21.7 | 20.2 | 18.7 | 17.9 |
| pellets SMFP | 1–2.5 | 0.3 | 0.48 | 26.9 | 22.9 | 22.3 | 22.0 | 20.8 | 20.6 |
| pellets coated | 1–2.5 | 0.3 | 0.48 | 28.2 | 29.4 | 28.8 | 28.4 | 25.6 | 24.8 |

Figure 3:
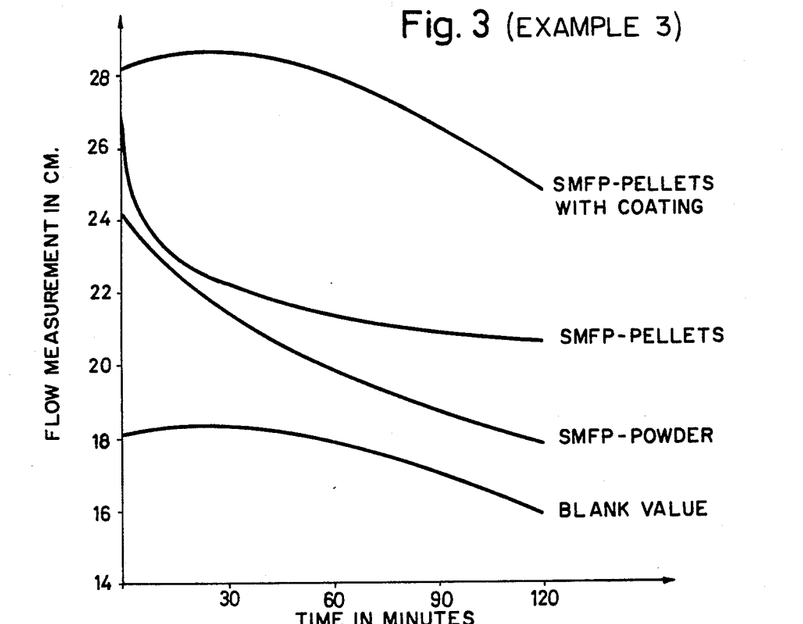

The results obtained are graphically illustrated in FIG. 3 of the accompanying drawings.

EXAMPLE 4

Production of pellets 1000 g. SMFP powder in the pelletising dish were wetted by spraying with 300 to 400 g. EG and shaped into green pellets. These were compacted by rotation of the dish. Subsequently, the pellets were hardened with warm air for about 1 to 2 hours. The material produced was sieved out and, if necessary, ground.

The so-obtained SMFP pellets and the SMFP powder were tested by determination method (A), the following results being determined:

| additives | particle size (mm.) | dosaging, ref. to cement (%) | water-cement ratio | flow measurement in cm. after min. | | | | |
|---|---|---|---|---|---|---|---|---|
| | | | | 0 | 30 | 60 | 90 | 120 |
| without SMFP | — | — | 0.46 | 17.8 | 17.7 | 17.0 | 16.4 | 15.9 |
| powder SMFP | 0–0.2 | 0.3 | 0.47 | 24.1 | 21.3 | 20 | 18.8 | 17.9 |
| pellets SMFP | 3–8 | 0.3 | 0.47 | 23.2 | 27.4 | 28.2 | 25.3 | 24.2 |

Figure 4:
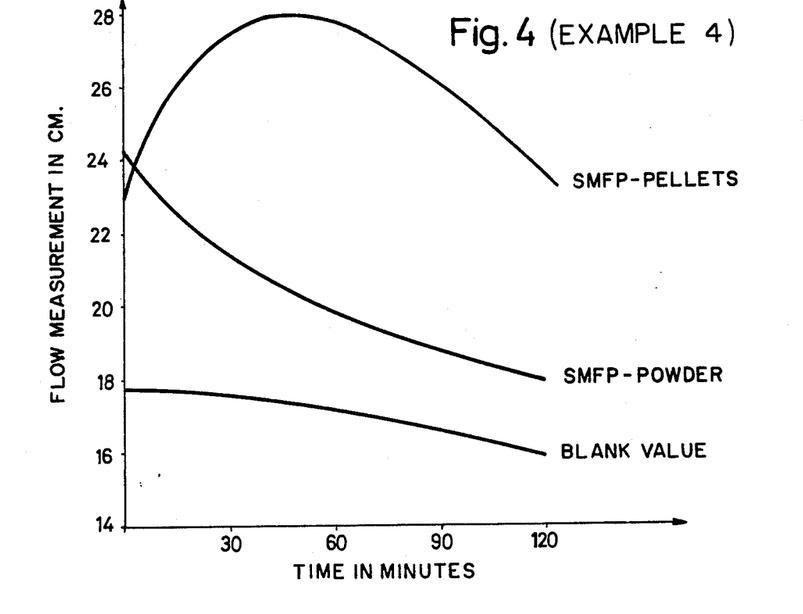

The results obtained are graphically illustrated in FIG. 4 of the accompanying drawings.

EXAMPLE 5

Production of pellets

The pellets were produced as described in Example 4. The SMFP pellets and the SMFP powder were tested by determination method (B), the following results being obtained:

| additives | particle size (mm.) | dosaging, ref. to cement (%) | water-cement ratio | mortar spreading measurement in cm. after min. | | | | |
|---|---|---|---|---|---|---|---|---|
| | | | | 0 | 30 | 60 | 90 | 120 |
| without SMFP | — | — | 0.5 | 18.3 | 15.8 | 15.4 | 14.7 | 14.7 |
| powder SMFP | 0–0.2 | 0.5 | 0.5 | 20.4 | 17.8 | 17.0 | 16.6 | 15.6 |
| pellets SMFP | 5–8 | 0.5 | 0.5 | 20.3 | 19.0 | 18.1 | 18.2 | 18.2 |

Figure 5:
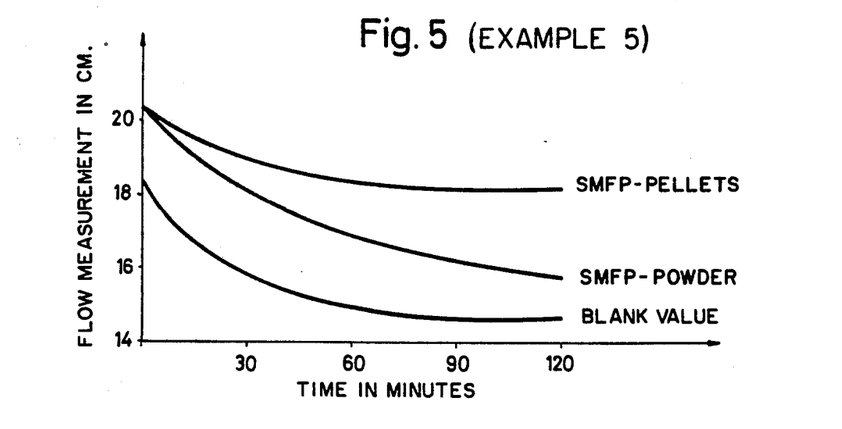

The results obtained are graphically illustrated in FIG. 5 of the accompanying drawings.

EXAMPLE 6

NSFP powder was sprayed with water. The green pellets thereby formed were then dried. The dry material was sieved and, if necessary, ground.

The NSFP pellets and the NSFP powder were tested by determination method (A), the following results being obtained:

| additives | particle size (mm.) | dosaging, ref. to cement (%) | water-cement ratio | cement flow measurement in cm. after min. | | | | |
|---|---|---|---|---|---|---|---|---|
| | | | | 0 | 30 | 60 | 90 | 120 |
| without NSFP | — | — | 0.47 | 17.8 | 17.7 | 17.0 | 16.4 | 15.9 |
| powder NSFP | 0–0.3 | 0.3 | 0.47 | 22.7 | 20.3 | 19.8 | 18.7 | 18.3 |
| NSFP pellets | 3–5 | 0.3 | 0.47 | 26.8 | 25.5 | 24.8 | 23.0 | 22.8 |

Figure 6:
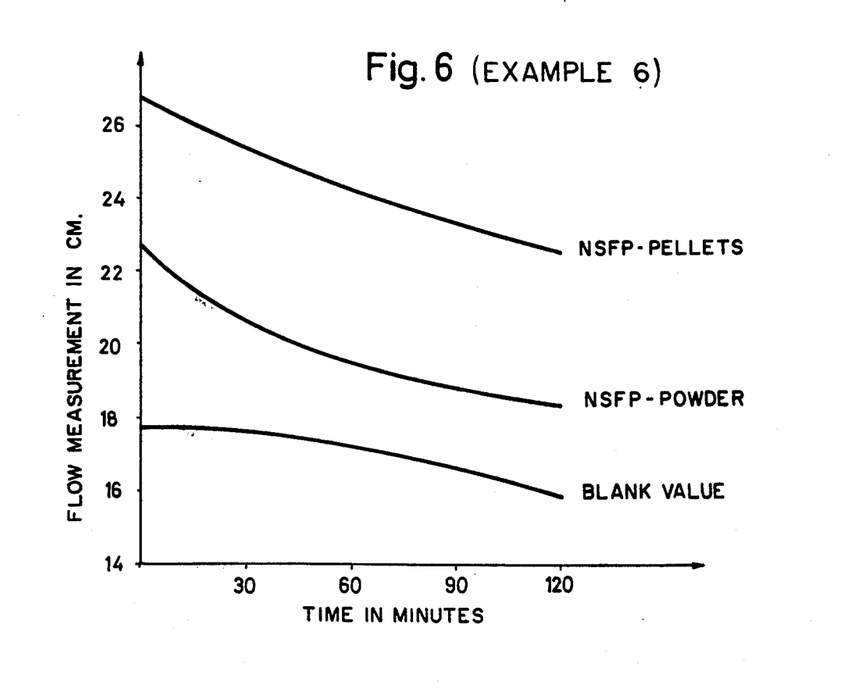

The results obtained are graphically illustrated in FIG. 6 of the accompanying drawings.

EXAMPLE 7

Making lumps

LS powder was mixed with a 42.8% aqueous LS solution and the paste so obtained was dried with warm air. The dry material was ground and sieved.

The LS pellets so produced and the LS powder were tested by determination method (A), the following results being obtained:

| additives | particle size (mm.) | dosaging, ref. to cement (%) | water-cement ratio | cement flow measurement in cm. after min. | | | | |
|---|---|---|---|---|---|---|---|---|
| | | | | 0 | 30 | 60 | 90 | 120 |
| without LS | — | — | 0.44 | 18.1 | 18.4 | 17.8 | 16.5 | 16.2 |
| powder LS | 0–0.2 | 0.3 | 0.44 | 22.1 | 20.5 | 19.2 | 18.0 | 17.3 |
| LS pellets | 3–5 | 0.3 | 0.44 | 24.3 | 23.2 | 22.8 | 22.2 | 21.9 |

Figure 7:
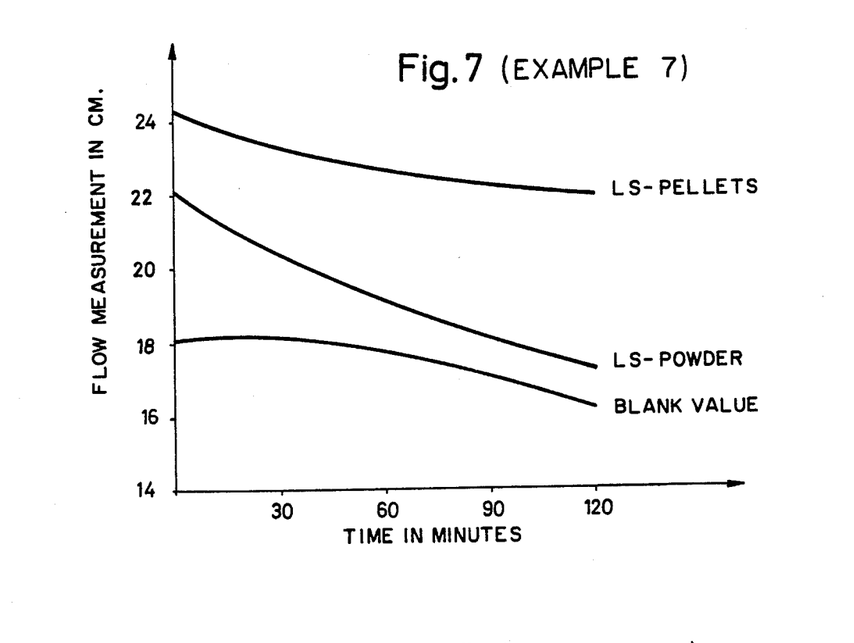

The results obtained are graphically illustrated in FIG. 7 of the accompanying drawings.

EXAMPLE 8

Production of pellets

Pre-mixed material (SMFP:PEG=95:5) in a pelleting dish was sprayed with EG and compacted. Subsequently, the pellets were heat-treated for 50 minutes at 50° C. in a rotary evaporator. The material so produced, as well as the powder, were tested by determination method (A), the following results being obtained:

| additives | particle size (mm.) | dosaging, ref. to cement (%) | water-cement ratio | cement flow measurement in cm. after min. | | | | |
|---|---|---|---|---|---|---|---|---|
| | | | | 0 | 30 | 60 | 90 | 120 |
| without SMFP | — | — | 0.46 | 18.2 | 17.7 | 17.1 | 16.5 | 16.1 |
| SMFP-PEG powder | 0–0.2 | 0.3 | 0.46 | 25.3 | 21.1 | 19.5 | 18.8 | 17.4 |
| SMFP-PEG pellets | 1–3 | 0.3 | 0.46 | 26.9 | 26.6 | 24.5 | 23.6 | 22.3 |

Figure 8:
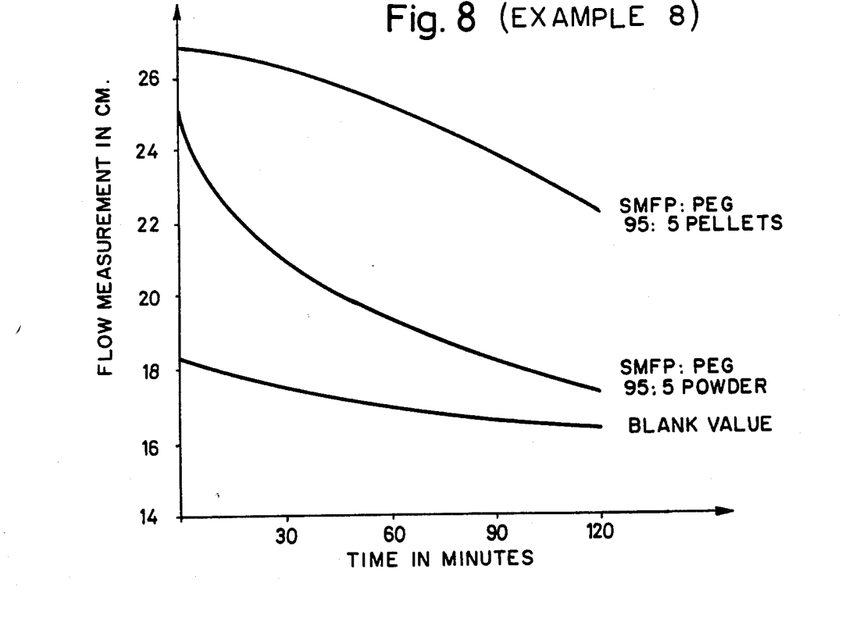

The results obtained are graphically illustrated in FIG. 8 of the accompanying drawings.

EXAMPLE 9

Making lumps by pressing

SMFP powder was mixed with 2% PEG and briquetted in a hand stamp press with a closed mould. The pressed bodies had a diameter of 3.6 cm. and a height of about 1.6 cm. They were again ground and sieved. The material so produced and the SMFP powder were tested by determination method (A), the following results being obtained:

| additive | particle size (mm.) | dosaging, ref. to cement (%) | water-cement ratio | cement flow measurement in cm. after min. | | | | |
|---|---|---|---|---|---|---|---|---|
| | | | | 0 | 30 | 60 | 90 | 120 |
| without SMFP | — | — | 0.45 | 18.2 | 18.4 | 17.8 | 16.5 | 16.2 |
| SMFP powder | 0–0.2 | 0.3 | 0.45 | 24.3 | 21.7 | 20.2 | 18.7 | 17.9 |
| SMFP briquettes | 1–3 | 0.3 | 0.45 | 27.3 | 28.0 | 28.5 | 28.7 | 26.0 |

Figure 9:
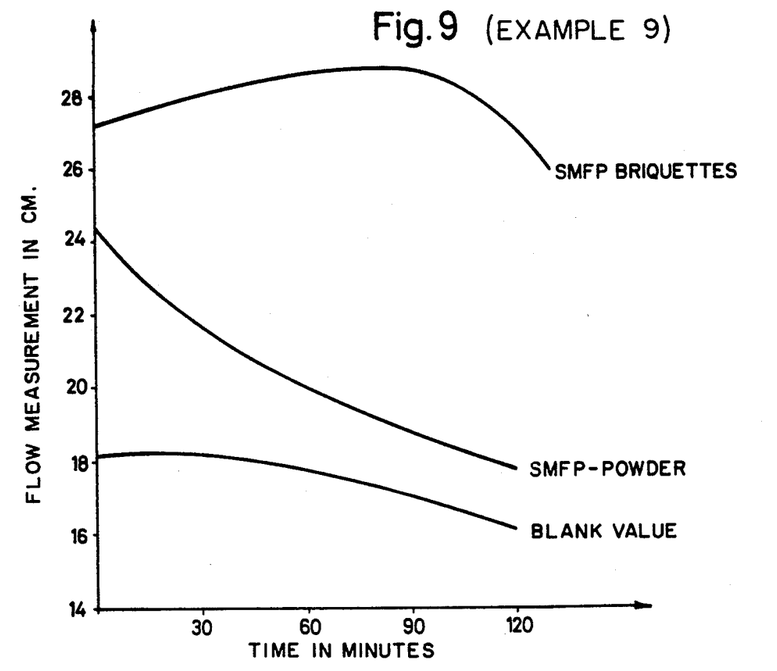

The results obtained are graphically illustrated in FIG. 9 of the accompanying drawings.

EXAMPLE 10

Making lumps by pressing

SMFP powder was sprayed with 5% EG, followed by working as described in Example 9, whereafter the powder and briquettes were tested by determination method (A), the following results being obtained:

| additive | particle size (mm.) | dosaging, ref. to cement (%) | water-cement ratio | cement flow measurement in cm. after min. | | | | |
|---|---|---|---|---|---|---|---|---|
| | | | | 0 | 30 | 60 | 90 | 120 |
| without SMFP | — | — | 0.45 | 18.0 | 18.4 | 17.8 | 16.5 | 16.2 |
| SMFP powder | 0–0.2 | 0.3 | 0.45 | 24.3 | 21.7 | 20.3 | 18.7 | 17.9 |
| SMFP briquettes | 3–5 | 0.3 | 0.45 | 26.8 | 28.5 | 28.6 | 28.5 | 27.1 |

Figure 10:
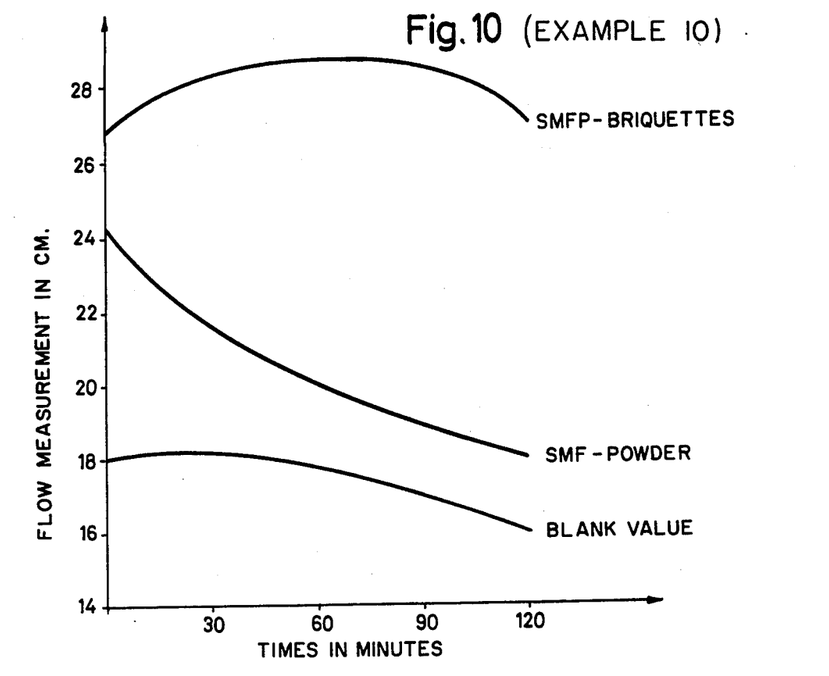

The results obtained are graphically illustrated in FIG. 10 of the accompanying drawings.

EXAMPLE 11

Making lumps by pressing

Production took place according to Example 10. The so produced material and the SMFP powder were tested by determination method (C), the following results being obtained:

| additives | particle size (mm.) | dosaging, ref. to cement (%) | water-cement ratio | fresh concrete temperature (°C.) | concrete spreading measurement in cm. after min. | | | | |
|---|---|---|---|---|---|---|---|---|---|
| | | | | | before addition | 0 | 30 | 60 | 90 | 120 |
| SMFP powder | 0–0.2 | 0.4 | 0.54 | 20 | 42 | 60 | 54.5 | 50 | 46 | 41.5 |
| SMFP briquettes | 2–3 | 0.4 | 0.54 | 20 | 42.5 | 52 | 60.5 | 60.5 | 58 | 50 |

Figure 11:
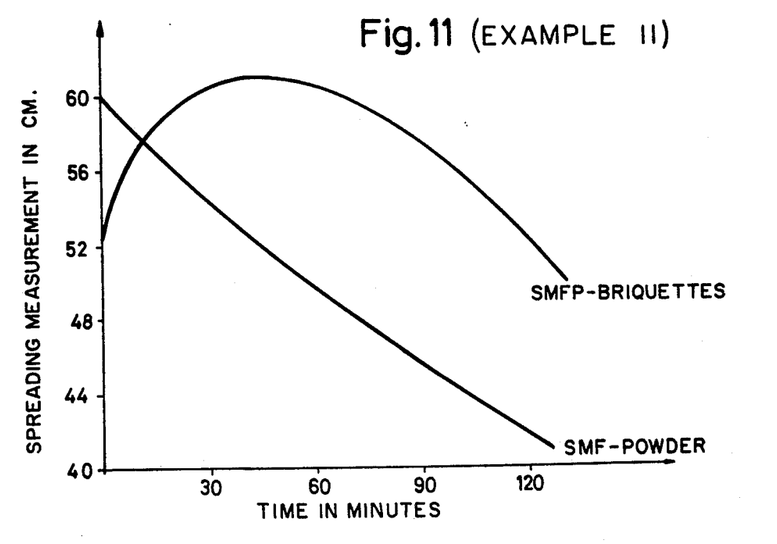

The results obtained are graphically illustrated in FIG. 11 of the accompanying drawings.

EXAMPLE 12

Prevention of a coalescent effect

The appearance of coalescence of water-soluble additives in the production of aqueous solutions was suppressed by making lumps of the powder.

The experiments were carried out with a V2A steel triangular stirrer of a rod of 6 mm. diameter and a lateral length of 50 mm. The stirrer mechanism had a speed of rotation of 260 to 300 rpm. Dispersion took place in a squat 600 ml. glass beaker. The material to be dispersed was introduced with a feed chute.

The production of the SMFP pellets took place as described in Example 1.

Production of SMFP briquettes:

SMFP powder was compacted in a slabbing press and subsequently ground and sieved.

Production of PEG briquettes:

PEG powder was agglomerated in a laboratory granulation dish by spraying with water and then dried with warm air. The dry material was ground and sieved.

Experiments carried out with SMFP powder and SMFP pellets or briquettes, as well as with PEG powder, showed a marked tendency to coalesce by the powder but no coalescence in the case of the granulates.

EXAMPLE 13

Gypsum flow measurement gypsum: particulate gypsum DIN 1168 additives: SMFP powder and briquettes. The dosaging refers to the gypsum.

additive addition: the additives were mixed into the gypsum.

retarder: the solidification of the gypsum was controlled by the addition of potassium tetraborate.

water: the flow measurement of the gypsum paste without additive was adjusted to 17±1 cm. All further flow measurements were assessed on this water-gypsum ratio.

Production and determination of the gypsum paste:

300 g. Gypsum were sprinkled, within the course of half a minute, into a squat 1 liter glass beaker with a weighed amount of water containing a retarder. Thereafter, the slurry was well mixed up for 2 minutes with a spoon.

The gypsum paste was subsequently poured into a vicat ring up to the edge, this vicat ring standing on a dry, fat-free, plane glass plate. After filling, the vicat ring was immediately raised 2 cm. and held for about 5 seconds over the outflowing slurry. The diameter of the slurry was determined on two axes lying othogonally to one another. The flow measurement in cm. is the arithmetic average of these two measurement values.

Flow measurement as a function of time:

After a pot life of 15 and 30 minutes, the gypsum paste was again stirred for 2 minutes. Subsequently, the flow test was carried out as in the case of the immediate value.

The production of SMFP briquettes took place as described in Example 12. The following results were obtained:

| additives | particle size (mm.) | dosaging, ref. to gypsum (%) | potassium tetraborate, ref. to gypsum (%) | water-gypsum ratio | flow measurement in cm. after min. 0 | 15 | 30 |
|---|---|---|---|---|---|---|---|
| without | — | — | 0.83 | 0.5 | 16.5 | 13.8 | 12.3 |
| SMFP powder | 0-0.2 | 0.3 | 0.83 | 0.5 | 22.5 | 21.6 | 18.9 |
| SMFP briquettes | 1-4 | 0.3 | 0.83 | 0.5 | 23.4 | 23.7 | 21.0 |

EXAMPLE 14

Saving of additive

Briquettes were produced in the manner described in Example 12.

The SMFP briquettes, as well as the SMFP powder, were tested by determination method (A).

The measurement value results given in the following Table clearly show that the liquefying effect of a 0.2% SMFP briquette dosaging, referred to the amount of cement, acted slightly better than that of a 0.35% SMFP powder dosaging.

| additives | particle size (mm.) | dosaging, ref. to cement (%) | water-cement ratio | flow measurement in cm. after min. 0 | 30 | 60 | 120 |
|---|---|---|---|---|---|---|---|
| without | — | — | 0.47 | 18.0 | 17.8 | 17.1 | 16.0 |
| SMFP powder | 0-0.2 | 0.35 | 0.47 | 24.5 | 21.3 | 19.7 | 18.1 |
| SMFP briquettes | 2-3 | 0.20 | 0.47 | 24.7 | 23.5 | 23.3 | 19.8 |
| SMFP briquettes | 2-3 | 0.15 | 0.47 | 22.2 | 22.0 | 21.4 | 18.8 |

Figure 12:
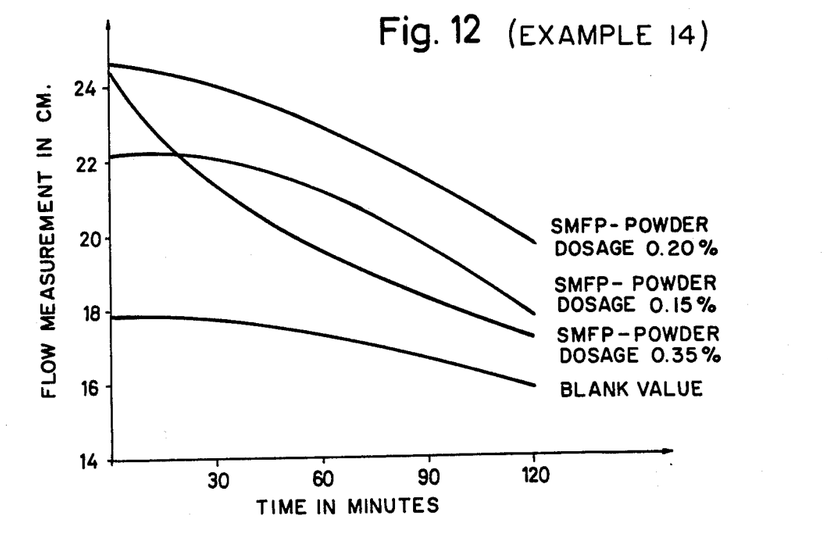

The results obtained are graphically illustrated in FIG. 12 of the accompanying drawings.

EXAMPLE 15

SMFP pellets with cement coating

Pellets were produced as follows: the SMFP powder was pelletised in a laboratory granulating dish by spraying with EG. Subsequently, the green pellets were sprinkled with PZ 450 F cement, so that a cement envelope resulted. The granulates were stored for some days in the air and then sieved to the desired particle size. The weight ratio of SMFP powder:cement was 10:6. The following results were obtained:

| additive | particle size (mm.) | dosaging, ref. to cement (%) | water cement ratio | flow measurement in cm. after min. 0 | 30 | 60 | 90 | 120 |
|---|---|---|---|---|---|---|---|---|
| without | — | — | 0.46 | 18.0 | 17.9 | 17.2 | 16.6 | 16.1 |
| SMFP-cement powder | -0.1 | 0.4 | 0.46 | 20.7 | 19.2 | 18.2 | 17.9 | 17.0 |
| SMFP pellets coated | 3-5 | 0.4 | 0.46 | 27.7 | 27.0 | 26.5 | 25.1 | 23.7 |

Figure 13:
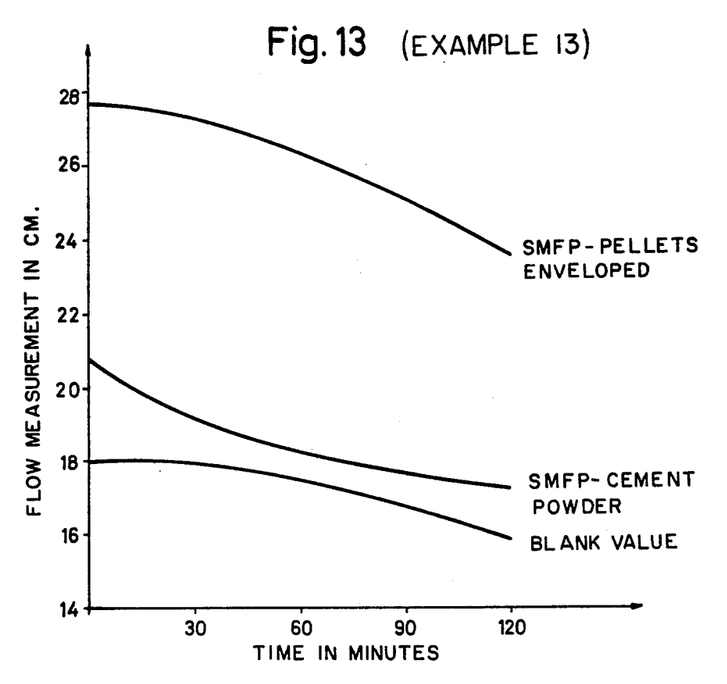

The results obtained are graphically illustrated in FIG. 13 of the accompanying drawings.

It will be understood that the specification and examples are illustrative but not limitative of the present invention and that other embodiments within the spirit and scope of the invention will suggest themselves to those skilled in the art.

What is claimed is:

1. Solid additive for modifying water-hardening binding agents, which additive comprises aggregates consisting of mechanically compressed fine particles with a grain size of from 0.1 to 10 mm and being composed of an agent consisting of a naphthalenesulphonic acid derivative-formaldehyde condensate, a resin based on an amino-s-triazine with at least two NH$_2$ groups and modified with sulphite or sulphonic acid, a sulphite- or sulfonic acid-modified melamine-formaldehyde polycondensate, a copolymer based on styrene and acrylonitrile, a lignin sulfonate, or a phenol-sulphonic acid-formaldehyde polycondensation product.

2. Solid additive as claimed in claim 1 wherein the aggregates have a size of from 0.5 to 5 mm.

3. Solid additive as claimed in claim 1 wherein the aggregates have a size of from 0.5 to 3 mm.

4. Solid additive as claimed in claim 1 wherein said aggregates are provided with a coating.

5. Solid additive as claimed in claim 4 wherein said coating is an organic coating which is sparingly soluble or insoluble in water.

6. Solid additive as claimed in claim 4 wherein said coating is an inorganic coating.

7. Solid additive as claimed in claim 5 wherein said organic coating is polyvinyl acetate, polyvinyl propionate or polyacrylate.

8. Solid additive as claimed in claim 6 wherein said inorganic coating is hydrated cement or gypsum.

9. Method for regulating the working time of water-hardening binding agents, which method comprises incorporating into said binding agent a solid additive as claimed in claim 1.

10. Method as claimed in claim 9 wherein said aggregate is compressed or pelletized.

11. Method as claimed in claim 9 wherein the aggregate particles have a size of from 0.5 to 10 mm.

12. Method as claimed in claim 9 wherein said water-hardening binding agent is mortar, concrete or cement.

13. Water-hardening binding agent composition comprising at least one of cement, concrete, mortar or flooring plaster and incorporated therein a solid additive as claimed in claim 1.

* * * * *